United States Patent [19]

Simpson

[11] 4,015,244

[45] Mar. 29, 1977

[54] SELECTIVE ADDRESSING SYSTEM

[75] Inventor: Gary R. Simpson, Englewood, Colo.

[73] Assignee: Honeywell Inc., Minneapolis, Minn.

[22] Filed: Dec. 16, 1975

[21] Appl. No.: 641,247

[52] U.S. Cl. .......................................... 340/172.5
[51] Int. Cl.$^2$ ...................... G06F 7/00; G06F 7/06
[58] Field of Search ................................ 340/172.5

[56] References Cited
UNITED STATES PATENTS 3,820,081  6/1974  Donahue ..................... 340/172.5
3,821,715  6/1974  Hoff, Jr. et al. ............... 340/172.5

Primary Examiner—Gareth D. Shaw
Assistant Examiner—C. T. Bartz
Attorney, Agent, or Firm—Laurence J. Marhoefer; Lockwood D. Burton

[57] ABSTRACT

A selective addressing means for a plurality of signal modules includes a plurality of electrically identical component units each arranged to contain a plurality of the modules. Each component unit includes apparatus for internally establishing a self-address code at the input side of each of the component units. Also included in each of the component units is a structure which effectively modifies the address code found at the input side thereof and applies the modified code to the output side thereof. An interconnection is provided for applying the modified code from the output of the preceding component unit to constitute an overriding address code to the input of the next succeeding component unit. Logic circuitry is provided to correlate the thus established series of address codes with corresponding address signals from a central processor to access the selected module.

6 Claims, 3 Drawing Figures

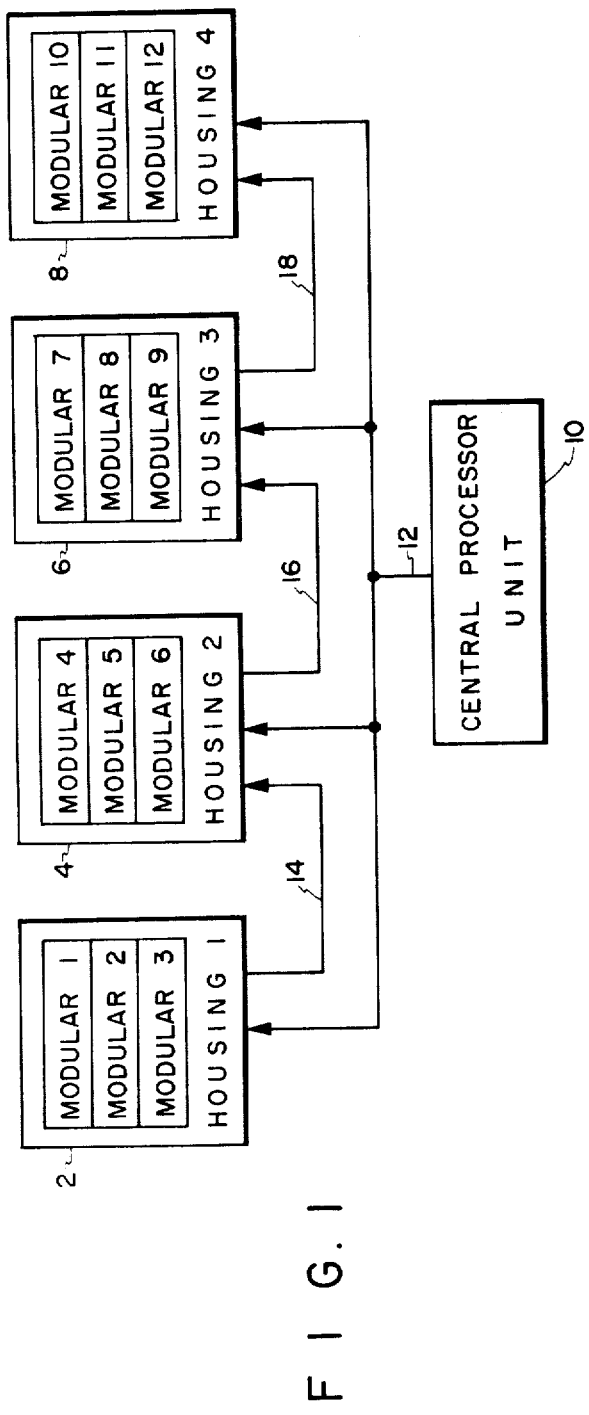
F I G. 1
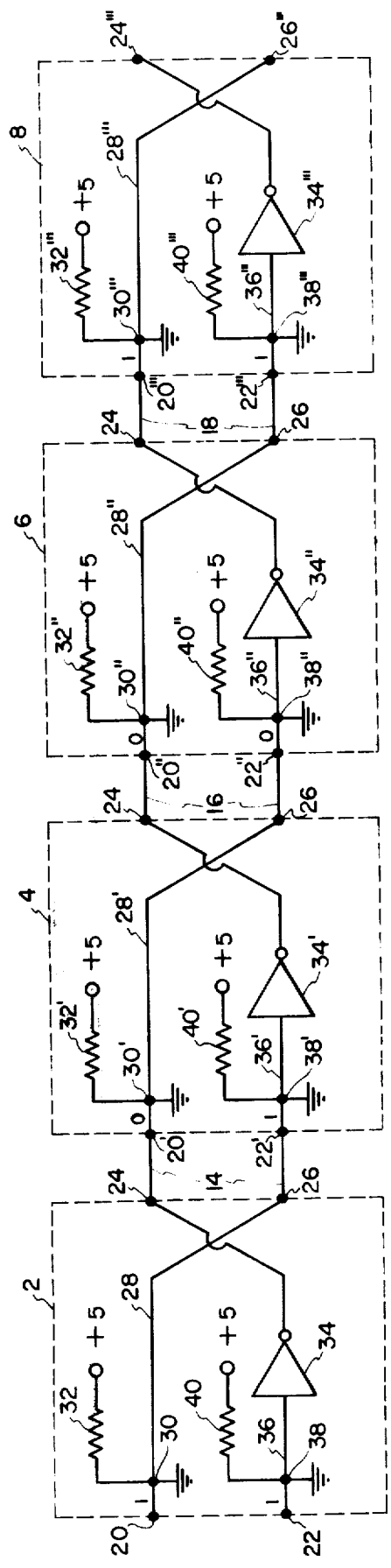
F I G. 2

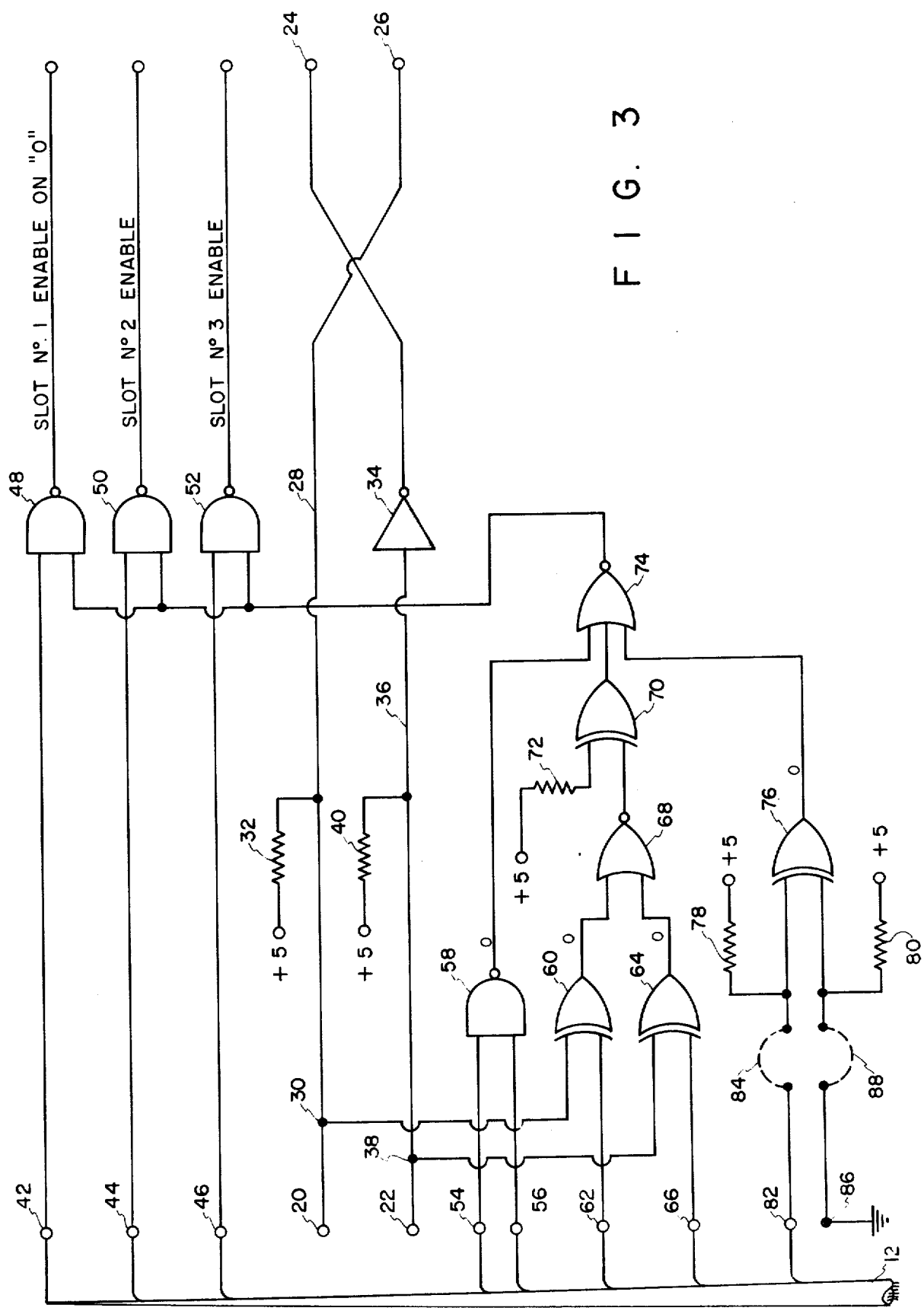

SELECTIVE ADDRESSING SYSTEM

BACKGROUND OF THE INVENTION

1. Field of the Invention

The present invention relates to data processing systems and, more particularly, to means for a selectively addressing individual ones of a plurality of component units by a central processor unit.

2. Description of the Prior Art

In the art relating to various forms of data handling and utilization systems, it is not unusual to have analog data from a number of sources, i.e., parametric sensors and the like, to be conditioned and converted to digital form, then have the digital data acted upon by a central processor unit which may, for example, be a microcomputer. In such systems, there is a need for means whereby the central processor unit can communicate with the several signal conditioners associated, respectively, with each of the several source means. To that end, a communication bus is usually provided. Also provided is means for addressing the several signal conditioners or other components, selectively. In the art, each component is identified with its own address code either by way of unique circuit parameters within the component, by way of its position relative to the other components, or by way of time sequence. Each of these addressing schemes has its drawbacks such as complexity and/or expense.

SUMMARY OF THE INVENTION

It is, therefore, an object of the present invention to provide an improved selective addressing means for a data processing system.

It is another object of the present invention to provide an improved selective addressing means as set forth which is characterized in simplicity and economy of structure and operation.

It is a further object of the present invention to provide an improved selective addressing means as set forth wherein a plurality of identical, interchangeable, addressed components may each be uniquely addressed.

In accomplishing these and other objects, there has been provided, in accordance with the present invention, a plurality of electrically identical module housing units, each capable of containing a plurality of component modules. While they are electrically identical in structure, each housing unit includes means for producing an identifying address code for the next succeeding housing unit; the first housing unit being self-identifying. Inasmuch as the housing units are identical, they are interchangeable. Additionally, for replacement parts purposes, only one type of unit need be stocked.

BRIEF DESCRIPTION OF THE DRAWINGS

A better understanding of the present invention may be had from the following detailed description when read in the light of the drawings, in which:

FIG. 1 is a block diagram of a system embodying the present invention;

FIG. 2 is a schematic diagram of the successive interconnection of the several housing units in accordance with the present invention; and FIG. 3 is a schematic diagram of the address logic included in each of the several housing units.

DESCRIPTION OF A PREFERRED EMBODIMENT

Referring, now, to the drawings in detail, there is illustrated in FIG. 1 a block diagram of a portion of a data processing system embodying the present invention. There is shown a first housing unit 2, a second housing unit 4, a third housing unit 6 and a fourth housing unit 8. Each of these housing units is identical to all of the others as to its basic circuit contents. Additionally, the mechanical structure of the housing units may also be identical with respect to each other, although, on the other hand, they may differ in dimension and configuration. The housing units each include a plurality of modular components. These modular components may, for example, represent signal conditioning interface circuits between individual analog sensors and a computer or central processor unit data bus. Since the data aspects of these modules are not a feature of the present invention, they have not been illustrated or specifically described. Such signal conditioning units, per se, are well known in the art. A central processor unit 10, which may, for example, be a microcomputer is connected by a communication bus 12 to each of the four housing units in parallel. Additionally, there is a cable 14 connected from the first housing unit 2 to the second housing unit 4. Similarly, a cable 16 is connected between the second housing unit 4 and the third housing unit 6. Again, a cable 18 is connected from the third housing unit 6 to the fourth housing unit 8.

Each of the twelve illustrated modules may be uniquely adapted to effect the signal conditioning of different analog sensors. On the other hand, some or all of them may be identical with respect to other modules. As noted above, the specific data aspects of the communication system does not constitute a feature of the present invention. Notwithstanding the similarities or differences of the several modules, the four housings are all electrically identical. Notwithstanding the sameness of the four housing units, because of the interconnecting cables 14, 16 and 18, each has a unique address code. The means for establishing such a unique set of address codes for the four units is illustrated in FIG. 2.

An initial perusal of the structure illustrated in FIG. 2 shows that the circuitry of each of the four housing units 2, 4, 6 and 8, are identical. For example, the housing unit 2 includes a first and a second input terminal 20, 22, respectively. The housing unit 2 is also provided with a first and a second output terminal 24, 26, respectively. A conductor 28 is connected directly between the first input terminal 20 and the second output terminal 26. At an intermediate point along the conductor 28 at a junction 30 there is connected a pull-up resistor 32 the other end of which is connected to a positive voltage supply which may be of the order of 5 volts. The second input terminal 22 of the housing unit 2 is connected through an inverter 34 to the first output terminal 24 by a conductor 36. Again, at a junction 38 along the conductor 36 between the input terminal 22 and the input to the inverter 34 there is connected a second pull-up resistor 40 the other end of which is connected to a positive voltage supply which may be of the order of 5 volts. Each of the other housing units are provided with identical circuit components. The corresponding units in the other three housing units have been identified with the same reference numerals with prime designations appended. Thus, each of the housing unit circuits are arranged to produce, at its output terminal, signals which are modified with respect to the signals applied to the input thereof. The cable 14, noted schematically in FIG. 1, is illustrated as a two-wire terminal 24 of the housing unit 2 to the first input terminal 20' of the second housing unit 4. The other wire of the two-wire connector of the cable 14 is connected between the second output terminal 26 of the first housing unit 2 and the second input terminal 22' of the second housing unit 4. Similarly, the cable 16 is a two-wire conductor connecting the output terminals 24', 26' of the second unit to the corresponding input terminals 20'' and 22'' of the third housing unit 6. Again, the cable 18 is a two-wire connection connecting the output terminal 24'' and 26'' of the third housing unit 6 to the corresponding input terminals 20''' and 22''' of the fourth housing unit 8.

When the several housing units are interconnected as illustrated in FIG. 2, it may be seen that each housing unit generates a unique identifying code for the next succeeding housing unit. The first housing unit, for example, has no signal applied to the two input terminals 20, 22, respectively. Thus, a logical "1" is generated at the junction 30 by operation of the pull-up resistor connected between that junction and the positive voltage source. Similarly, a logical 1 is generated at the junction 38 by operation of the pull-up resistor 40 connected between that junction and the positive voltage source. The logical 1 appearing at each of the two junctions 30, 38, as will be shown hereafter, constitutes an identifying address code for the first housing unit 2.

The logical 1 developed at the junction 30 is applied by the conductor 28 to the output terminal 26 of the housing unit 2. The logical 1 developed at the junction 38 is inverted by the inverter 34 to produce a logical "0" at the output terminal 24 of the housing unit 2. By means of a cable 14, the logical 0 appearing at the output terminal 24 of the first housing unit 2 is applied as input signal to the first input terminal 20' of the second housing unit 4. That logical 0 overrides the signal that would have been developed at the junction 30' by the operation of the pull-up resistor 32. Thus, the logical 0 appears at the junction 30'. The logical 1 which had appeared at the output terminal 26 of the first housing unit 2 is applied directly to the input terminal 22' of the second housing unit 4 to establish a logical 1 at the junction 38'. Thus, the inversion of the logical 1 at the junction 38 and the criss-cross of the two conductors with respect to the output terminals of the first housing unit have produced a unique address code of a logical 0 at the junction 30' and a logical 1 at the junction 38'.

With the identical type of inversion in one lead and criss-cross connection of the output terminals 24', 26' with respect to the input terminals 20, 21 produce a unique identifying address code for the third housing unit, to wit, a logical 0 at the junction 30'' and a logical 0 at the junction 38''. Again, following the inversion in the one lead and the criss-cross connection, there is produced at the output terminals 24'' and 26'' a unique identifying address code for the fourth housing unit. Thus, a logical 1 is produced at the junction 30''' and a logical 0 at the junction 38'''. The inverter 34''' and the criss-cross connections to the output terminals 24''' and 26''' are not used; they are shown as illustrating that the internal structure of all four of the housing units are identical and are totally interchangeable without disturbing the sequential generation of identifying address codes. From the foregoing, it may be seen that a unique address code has been developed for each of the four housing units with each housing unit developing the address code for the next succeeding unit. Thus, the identifying address code for housing unit 2 is a logical 1, 1 at the junction 30 and 38, respectively; for the housing unit 2 the corresponding address code is a logical 0, 1; for the third housing unit the corresponding address code is a logical 0, 0; and for the fourth unit the corresponding address code is a logical 1, 0.

While in FIG. 2, there has been shown the interconnection of the several housing units to effect a development of the individual address codes, in FIG. 3 there is illustrated the logic circuitry by which an individual housing unit may be selected for communication with the central processor unit as well as the selection of the particular one of the modules within that selected housing. While the logic circuitry of FIG. 3 is described in terms of it all being contained within the first housing unit 2, it will be observed that identical logic circuitry is contained in each of the other three housing units. Those components of the circuits illustrated in FIG. 3 which were also shown in FIG. 2 are identified with the same reference numerals as they were in FIG. 2. The communication bus 12 illustrated in FIG. 1 includes two bus components, first a data bus and an address bus. Inasmuch as the present invention does not relate to the details of the data communication, there is no specific recitation of the details of the data bus. The address bus, however, includes a number of individual leads which carry control signals from the central processor unit 10 to control the selection and enabling of the individual housing unit and module therein. To this end, three of the conductors in the address cable 12 are dedicated to the selection of a first, second or third slot in each of the four housing units. While the housing units are illustrated as having three modules each, it will be appreciated that each housing unit may contain more or fewer modules without departing from the spirit and scope of the present invention. In such case, there will be a corresponding number of dedicated conductors in the address cable 12. Those conductors are connected, respectively, to three terminals 42, 44, and 46. Under the control of the central processor unit, a logical 1 will appear on one of those three lines. The terminal 42 is connected to one input terminal of a NAND gate 48 identified with slot 1 or the first module in the first housing unit 2. The terminal 44 is connected to one input terminal of a second NAND gate 50 which is identified with slot 2 or the second module of the first housing unit 2. The terminal 46 is connected to one input terminal of a further NAND gate 52 which is identified with the slot 3 or third module of the housing unit 2. An "enable" signal is applied to the other input terminal of each of the three gates 48, 50 and 52 by the housing selection unit as will be described hereinbelow.

As noted above, for the first housing unit 2, no connection is made to the terminal 20 and 22. A pair of terminals 54, 56 are connected respectively to the first and second input of a NAND gate 58. The terminals 54 and 56 receive signals by way of the bus 12 from the central processor unit 10. An EXCLUSIVE OR gate 60 has one input terminal connected to the junction 30 of the address code circuit. A second terminal 62 receives a first address signal from the central processor unit 10 by way of the bus 12 and is connected to the second input of the EXCLUSIVE OR gate 60. A second EXCLUSIVE OR gate 64 has a first input terminal connected to the junction 38 of the housing address code circuit. A terminal 66 is connected to receive a second address signal from the central processor unit 10 by way of the bus 12 and is connected to the second input terminal of the EXCLUSIVE OR gate 64. The output terminal of the EXCLUSIVE OR gate 60 is connected to a first input terminal of a NOR gate 68. The output of the EXCLUSIVE OR gate 64 is connected to the other input terminal of the NOR gate 68. The output of the NOR gate 68 is connected to one input terminal of an EXCLUSIVE OR gate 70. The other input terminal of the EXCLUSIVE OR gate 70 is connected through a pull-up resistor 72 to a positive voltage source which may be of the order of 5 volts. The output of the EXCLUSIVE OR gate 70 is connected to one of three input terminals of a NOR gate 74. A second input to the NOR gate 74 is connected to the output terminal of the NAND gate 58. The output of the NOR gate 74 is connected to the second input terminal of each of the NAND gates 48, 50, 52 constituting an enabling signal for those NAND gates.

If we assume, for the moment, that the NOR gate 74 is a two-input terminal device, then the structure thus far defined is sufficient to effectively select one of the four housing units and one of the twelve modules contained therein. In order, however, to extend the selectability range of the structure, there is provided an extender circuit. The extender circuit includes an EXCLUSIVE OR gate 76, the output of which is connected to the third input terminal of the NOR gate 74. A first input terminal of the EXCLUSIVE OR gate 76 is connected through a pull-up resistor 78 to a positive voltage supply which may be of the order of 5 volts. A second input terminal of the EXCLUSIVE OR gate 76 is also connected through a pull-up resistor 80 to the positive voltage supply which may also be of the order of 5 volts. A first input terminal 82 is connected to receive extender signals from the central processor 10 through the bus 12. A selectively connected jumper 84 is arranged to connect the terminal 82 to the first input terminal of the EXCLUSIVE OR gate 76. A second terminal 86 is connected to ground. A second selectively connected jumper 88 is arranged to connect to the second input terminal of the EXCLUSIVE OR gate 76 to the terminal 86.

In the operation of the system described above, it may be seen that a logical 0 at the output of the NOR gate 74 will inhibit all of the NAND gates 48, 50, 52. With such an inhibit signal, no module in that particular housing unit may be selected. A logical 0 will appear at the output of the NOR gate 74 if a logical 1 is applied to any one of the three input terminals. To effect a selection of the illustrated housing, the central processor applies a logical 1 to each of the input terminals 54 and 56 of the NAND gate 58 to produce a logical 0 at the output thereof. Inasmuch as the central processor unit must communicate with a number of units other than the twelve modules in the four housings, the logical 1 at the terminals 54 and 56 constitute an enable signal for the selection of one of the housing units. If a remote component other than one of the modules in the housing unit is to be addressed, the signal on at least one of the two terminals 54, 56 will be a logical 0 producing a logical 1 at the output of the NAND gate 58 thereby inhibiting the NOR gate 74. It will be recalled that the signal at the junctions 30 and 38 are applied to one input terminal, respectively, of each of the EXCLUSIVE OR gates 60, 64. Assuming, for the moment, that the first housing unit 2 is under consideration, the signals applied to the first input terminal of each of the EXCLUSIVE OR gates 60, 64 will be a logical 1. If that first housing unit is to be selected for communication by the central processor unit 10, that central processor unit 10 will supply a corresponding logical 1 at each of the input terminals 62, 66. With a logical 1 appearing at both input terminals of each of the two EXCLUSIVE OR gates 60, 64, logical 0's will be produced at the output of both. A logical 0 applied to both input terminals of the NOR gate 68 produce a logical 1 at the output terminal thereof. That logical 1 is applied to one input terminal of the EXCLUSIVE OR gate 70. The other input terminal of the EXCLUSIVE OR gate 70 is clamped to a logical 1 condition by the pull-up resistor 72. With a logical 1 at both input terminals of the EXCLUSIVE OR gate 70, a logical 0 is produced at the output terminal thereof, hence, to the second input terminal of the NOR gate 74. If only four housing units are to be considered, the jumpers 84, 88 of the extender circuit are disconnected. That leaves both input terminals of the EXCLUSIVE OR gate 76 clamped to logical 1 inputs, thereby producing a logical 0 output to the third input terminal of the NOR gate 74. Thus, with a logical 0 at all three input terminals of the NOR gate 74 a logical 1 enabling signal is applied to the input of each of the NAND gates 48, 50, 52. The central processor unit 10 will supply, by way of the bus 12, a logical 1 to only a selected one of the three input terminals 42, 44 or 46, thereby selecting a first, second or third slot, i.e., module 1, 2, or 3 of the first housing unit. Thus, there has been effected a unique selection of one of the modules of the first housing unit.

If, now, the central processor unit 10 desires to communicate with one of the modules in the second housing unit 4, the selection process will be substantially identical to that just described with the exception that the signals appearing at the junctions 30 and 38, respectively, will be a logical 0 and a logical 1. Thus, a logical 0 will be applied to one input terminal of the EXCLUSIVE OR gate 60 and a logical 1 will be applied to the first input of the EXCLUSIVE OR gate 64. In order to select the second housing unit, thereby to enable the NAND gates 48, 50 and 52 of the second housing unit, the central processor 10 must supply, by way of the bus 12, a logical 0 to the input terminal 62 connected to the other input terminal of the EXCLUSIVE OR gate 60 and a logical 1 to the input terminal 66, in turn, connected to the other input terminal of the EXCLUSIVE OR gate 64. In other words, in order to select any one of the four housing units, the central processor unit 10 must supply to the terminals 62 and 66, signals which match the address codes supplied from the respective junctions 30, 38 of the several housing units. Thus, notwithstanding identical circuitry in each of the four housing units, the central processor may uniquely address any one thereof.

If it is desired to extend the range of the selectability to include an additional four housing units, the extender circuit is brought into operation by connecting one or both of the two jumpers 84, 88. For example, the jumper 84 must be connected in either case in order to allow the EXCLUSIVE OR gate 76 to respond to signals from the central processor unit by way of terminal 82. If only the jumper 84 is connected, then the central processor unit 10 must supply a logical 1 to the input terminal 82 in order to match the clamped logical 1 applied to the second input terminal of the EXCLUSIVE OR gate 76 if that group of four housing units is to be enabled. On the other hand, if the jumper 88 is connected, the second input terminal of the EXCLUSIVE OR gate 76 is clamped to ground. Accordingly, in order to select that group of four housing units, the central processor unit must supply a logical 0 to the input terminal 82.

Thus, it may be seen that there has been provided, in accordance with the present invention, an improved communication system between a central processor unit and a plurality of remote modular units which is characterized in both simplicity and economy, of structure and operation and wherein a plurality of identical components are interconnected whereby to produce self-generated address code identifications.

The embodiments of the invention in which an exclusive property or privilege is claimed are defined as follows:

1. In a data processing system, means for selectively addressing individual ones of a plurality of signal modules comprising:
   a plurality of component units each arranged to contain a plurality of signal modules,
   said plurality of component units being electrically identical with respect to each other,
   each of said component units having an input terminal means and an output terminal means,
   each of said component units including means for internally establishing a self-address code at said input terminal means, said self-address code being the same for all of said component units,
   each of said component units further including means for developing at the output terminal means thereof an address code which is different from the address code established at the input terminal means thereof, and
   means for so interconnecting said component units that the different address code appearing at the output terminal means of the preceding component unit overrides the self-address code of the succeeding component unit and constitutes the address code for that succeeding component unit whereby to provide a succession of unique address codes for successive component units.

2. A selective addressing means as set forth in claim 1 wherein said means for internally establishing a self-address code comprises biasing means for biasing each of a plurality of conductors to a predetermined voltage level representative of a digitally logical code.

3. The selective addressing means as set forth in claim 2 wherein said means for developing a different address code comprises a signal inverter serially connected in one of said conductors whereby the digitally logical representation on one of said conductors is inverted to a correlative code representation.

4. The selective addressing means as set forth in claim 3 wherein said means for developing a different address code further includes criss-cross connection means for positionally interchanging said output terminals with respect to said input terminals.

5. A selective addressing means as set forth in claim 1 and further including in each of said component units identical logic circuitry responsive to said unique address codes and applied address signals to provide an enable signal for a selected one of said plurality of component units.

6. The selective addressing means as set forth in claim 5 and further including means responsive to said enable signal and a further applied address signal for enabling a selected one of the signal modules in said selected one of said component units.

* * * * *